May 26, 1953  J. W. STOUFFER  2,639,497
COUPLING SCREW-ON MACHINE
Filed April 24, 1948  10 Sheets-Sheet 3
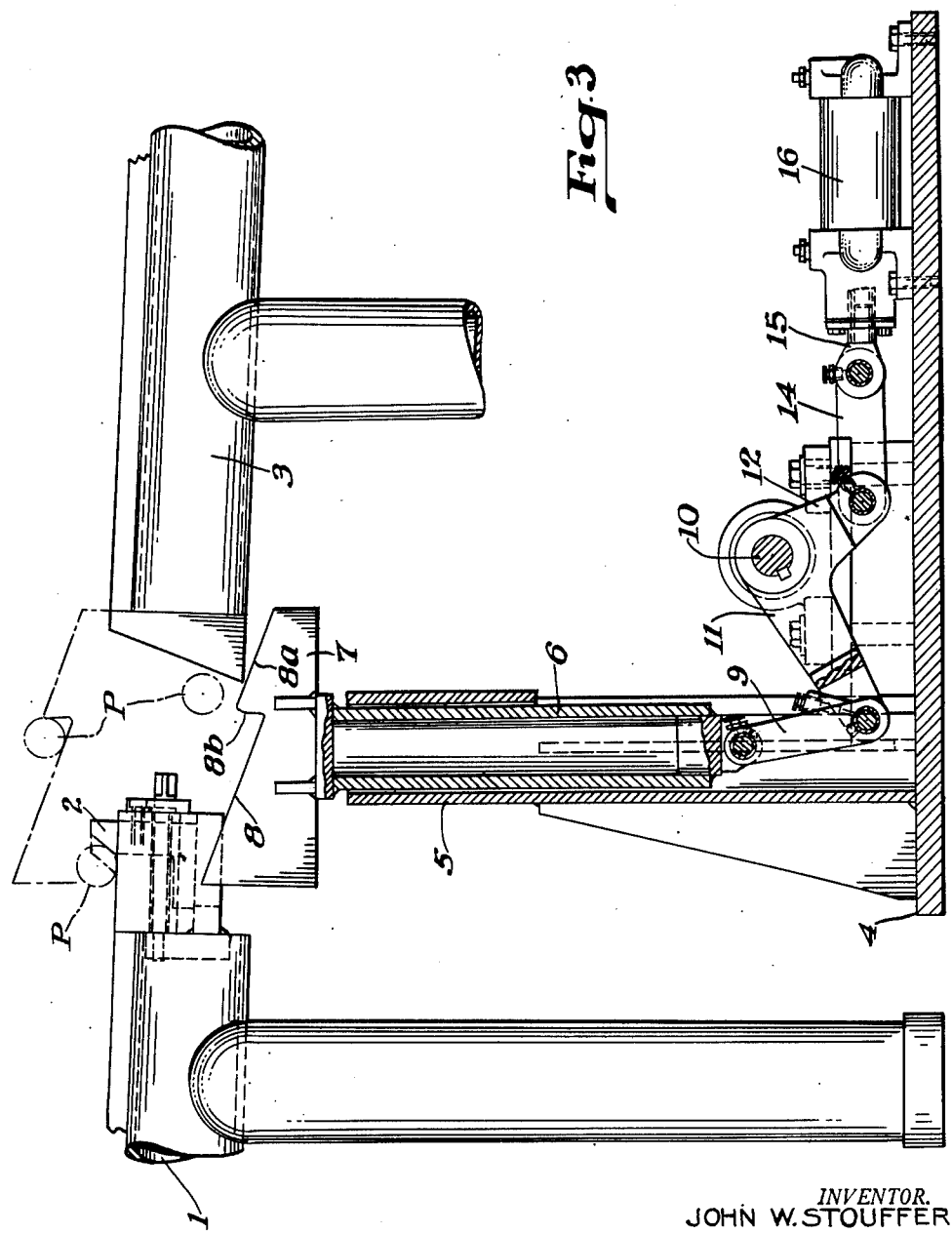
INVENTOR.
JOHN W. STOUFFER.
BY
Richey & Watts
ATTORNEYS.

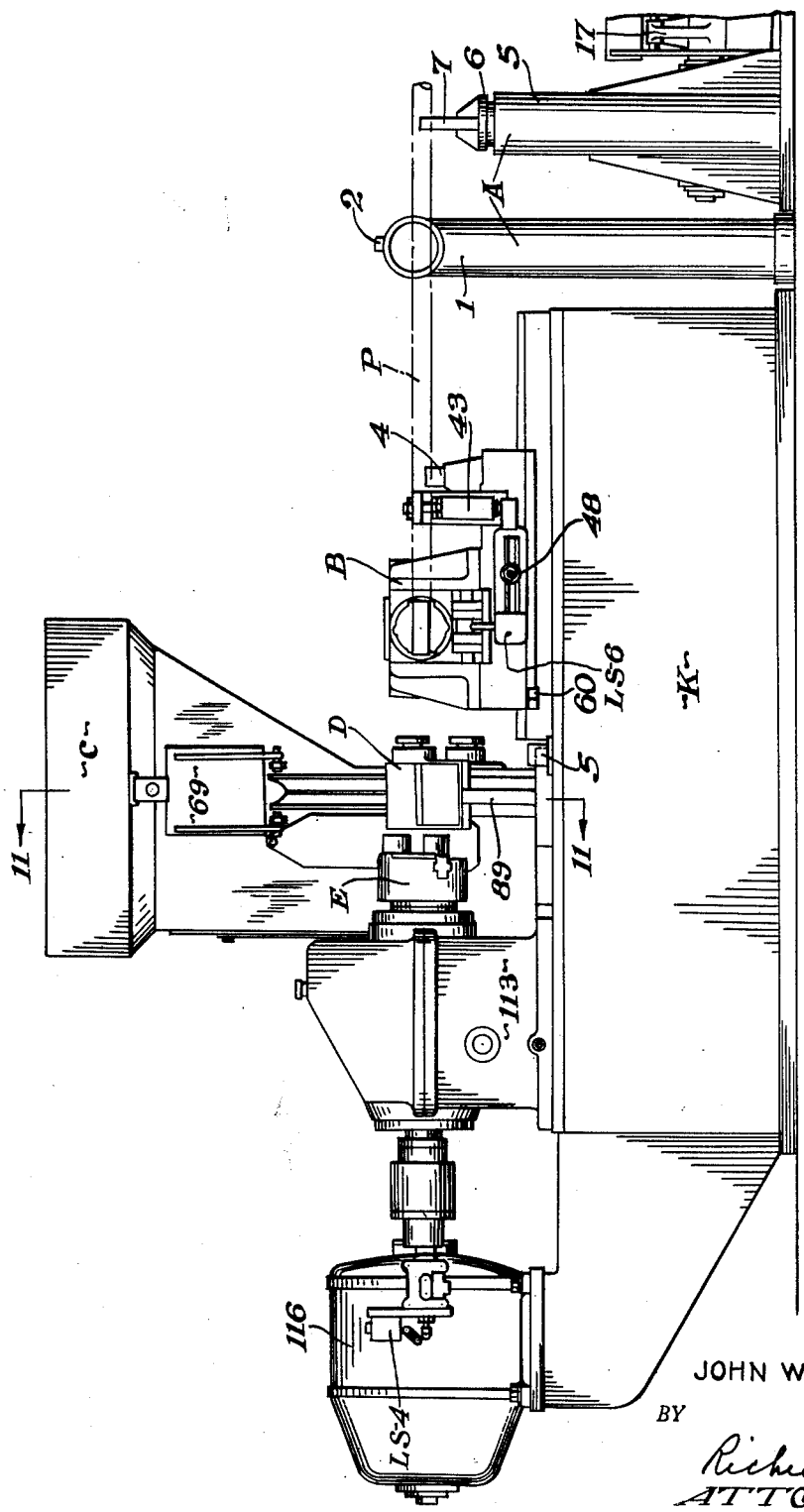

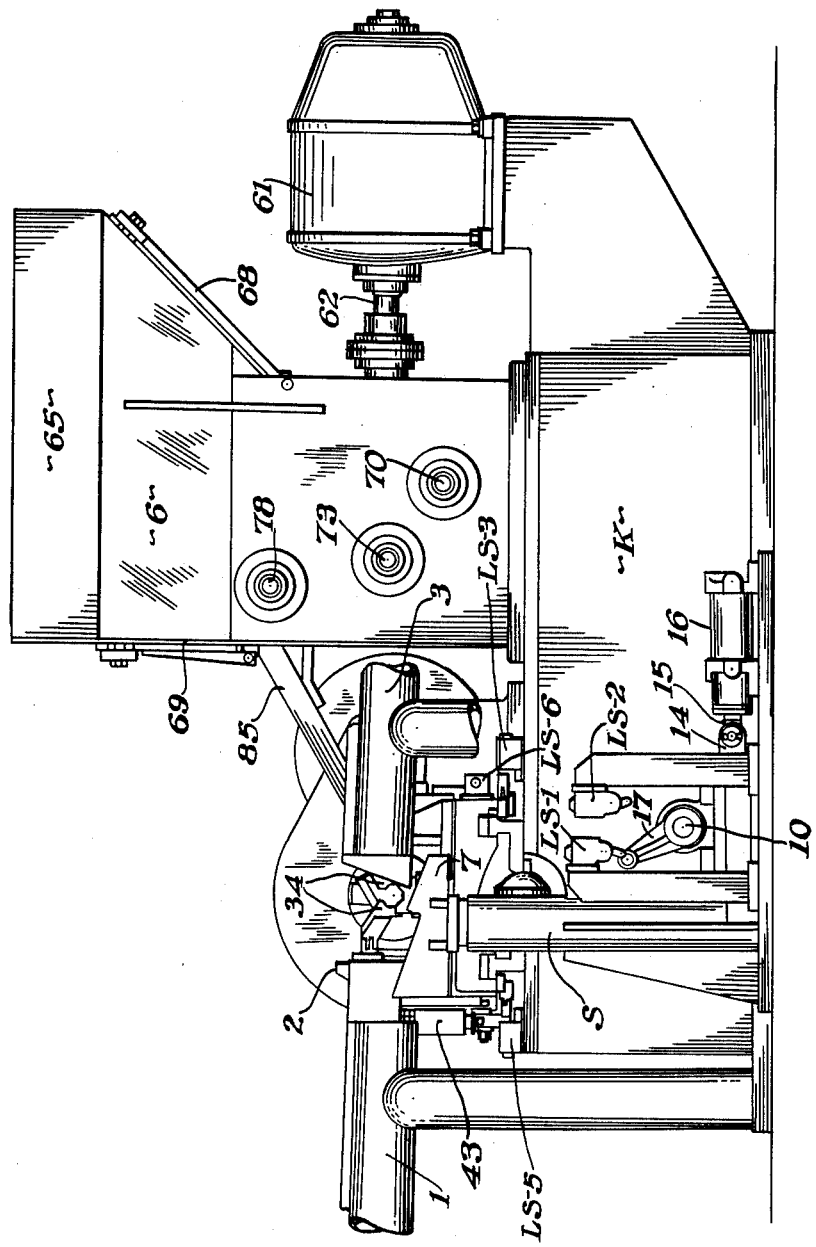

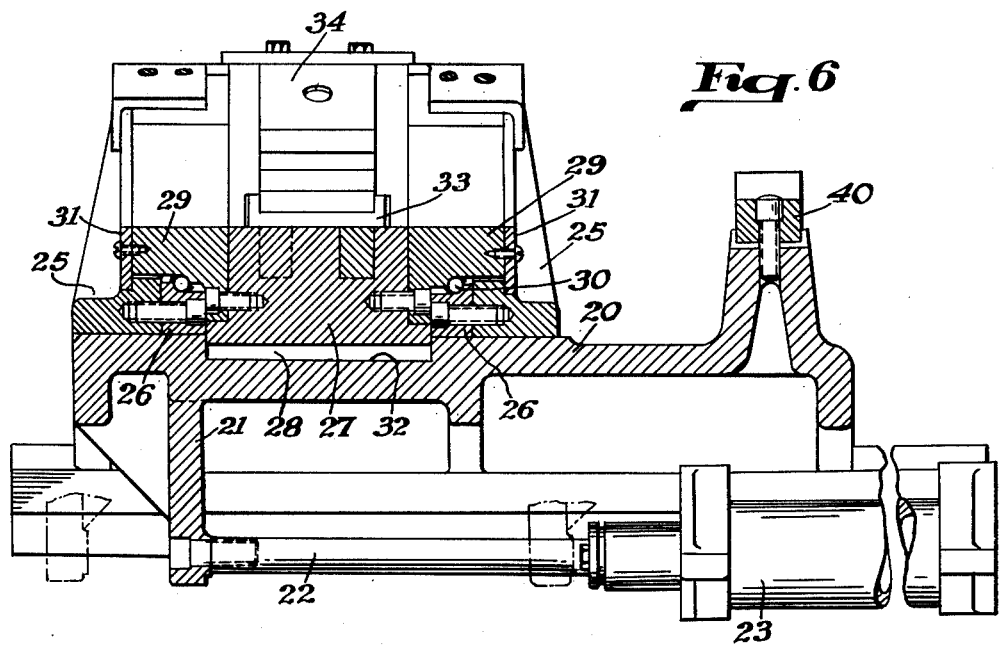
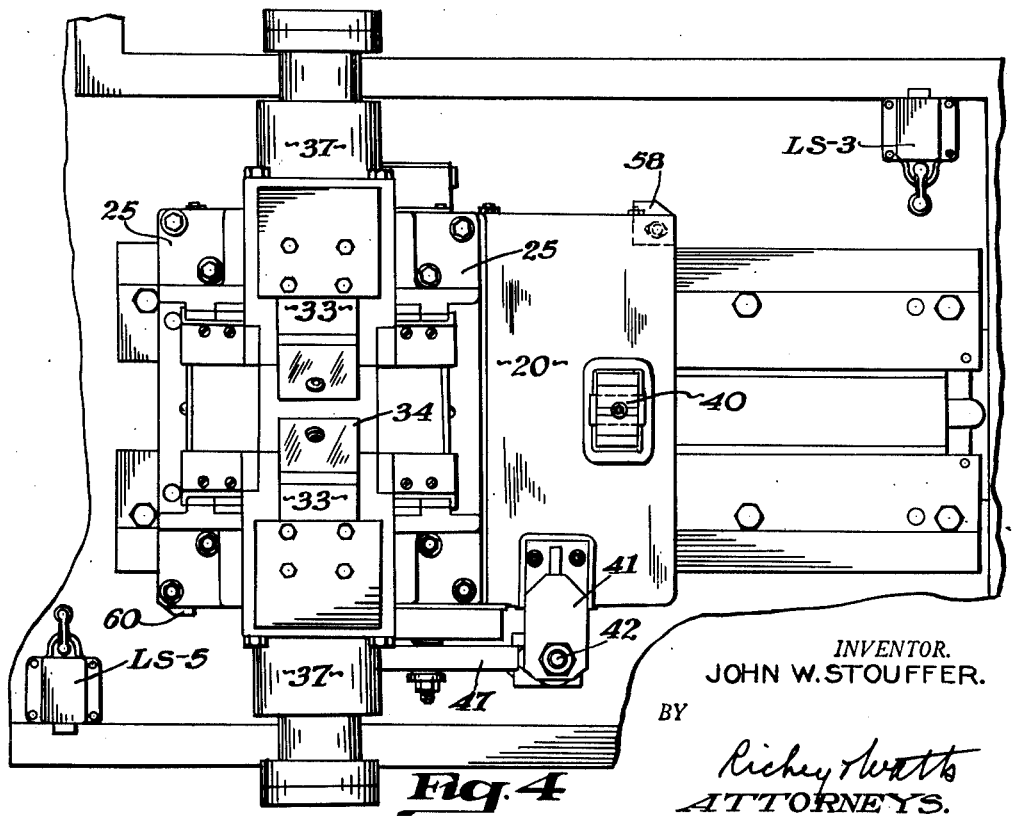

May 26, 1953  J. W. STOUFFER  2,639,497
COUPLING SCREW-ON MACHINE
Filed April 24, 1948  10 Sheets-Sheet 5

INVENTOR.
JOHN W. STOUFFER.
BY
Richey Watts
ATTORNEYS.

May 26, 1953 J. W. STOUFFER 2,639,497
COUPLING SCREW-ON MACHINE
Filed April 24, 1948 10 Sheets-Sheet 6
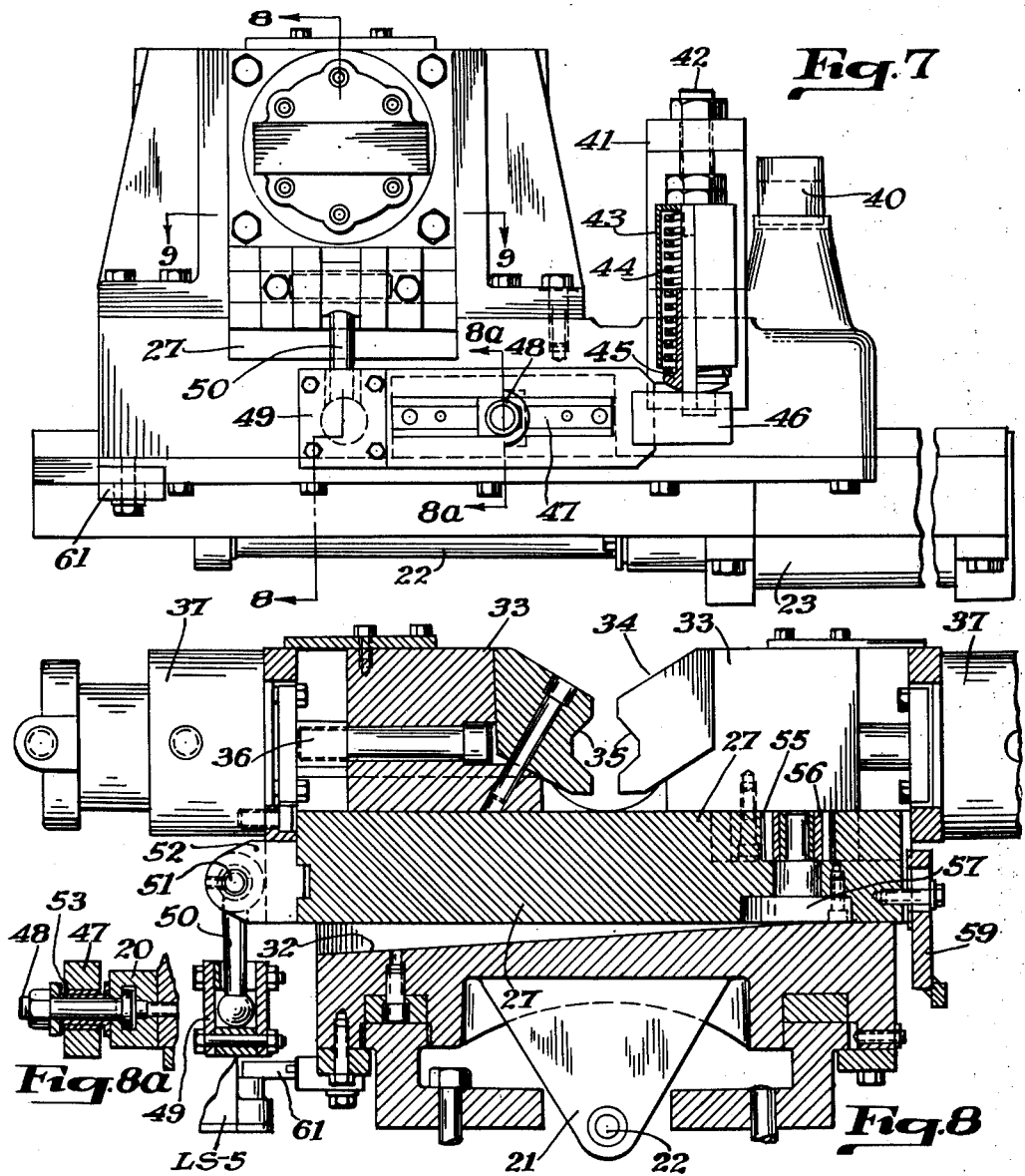
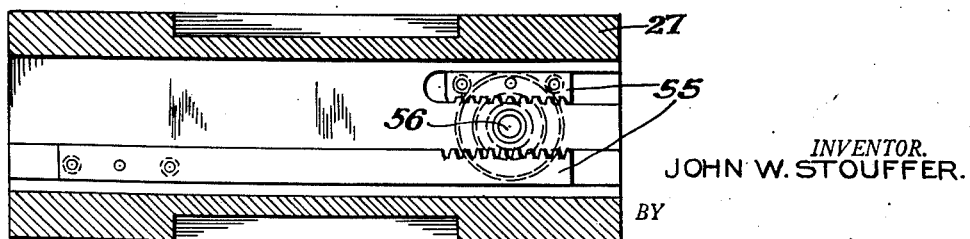
INVENTOR.
JOHN W. STOUFFER.
BY
Richey Watts
ATTORNEYS.

May 26, 1953 J. W. STOUFFER 2,639,497
COUPLING SCREW-ON MACHINE
Filed April 24, 1948 10 Sheets-Sheet 7

INVENTOR.
JOHN W. STOUFFER.
BY
Richey Watts
ATTORNEYS.

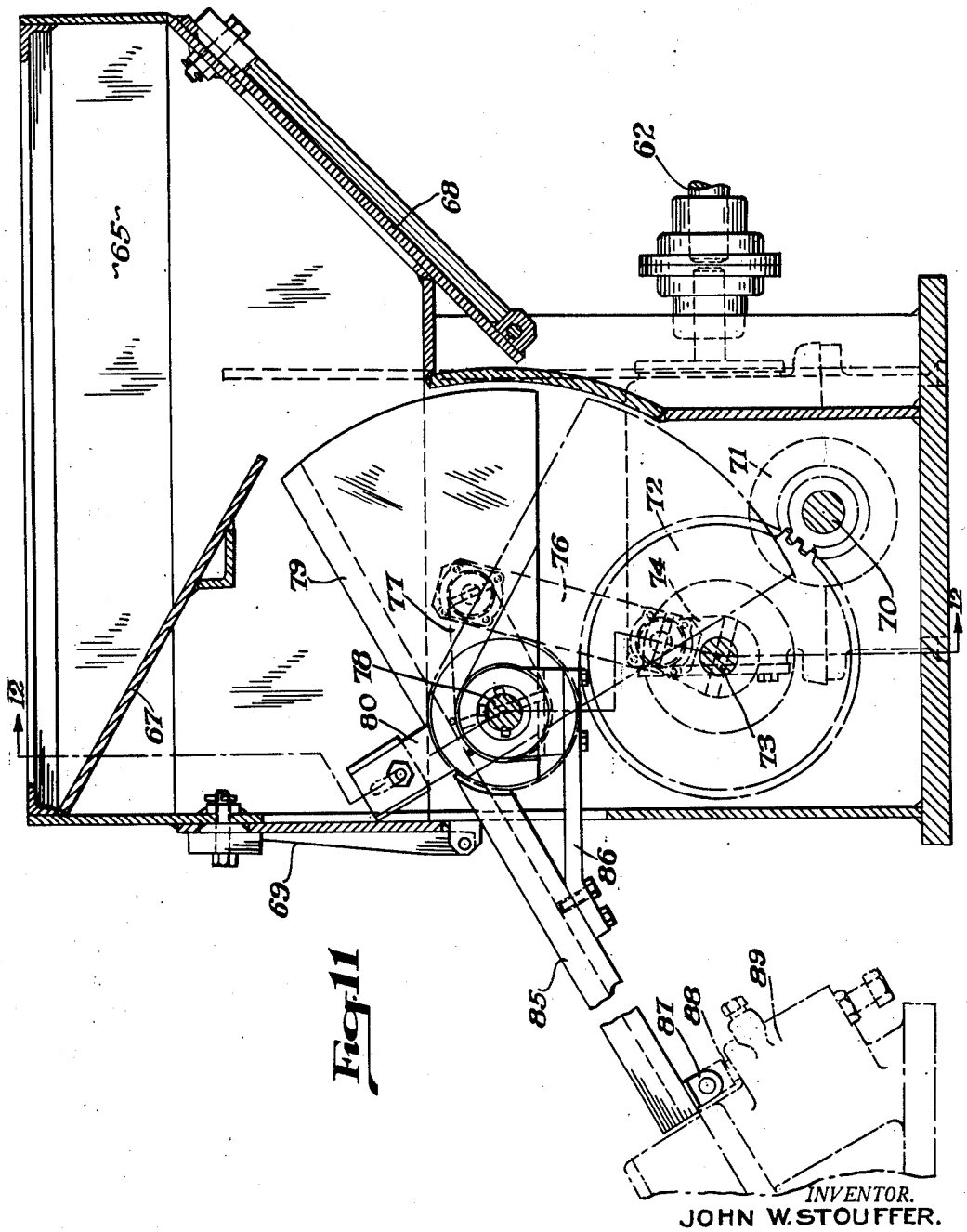

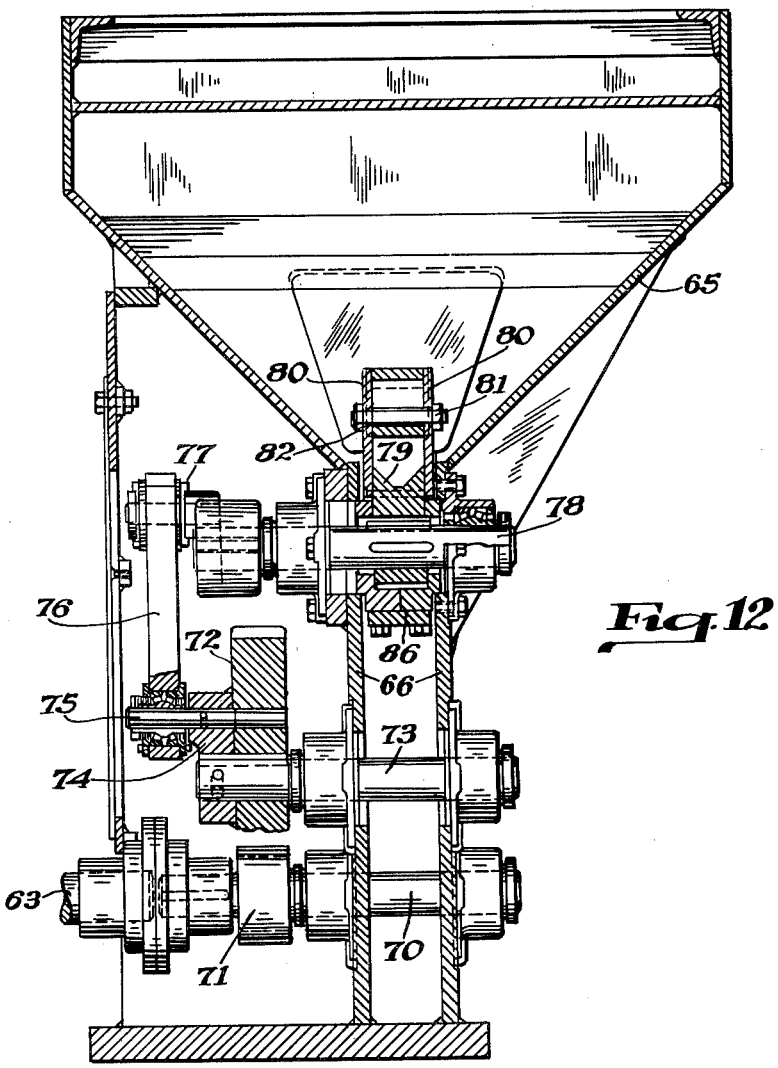

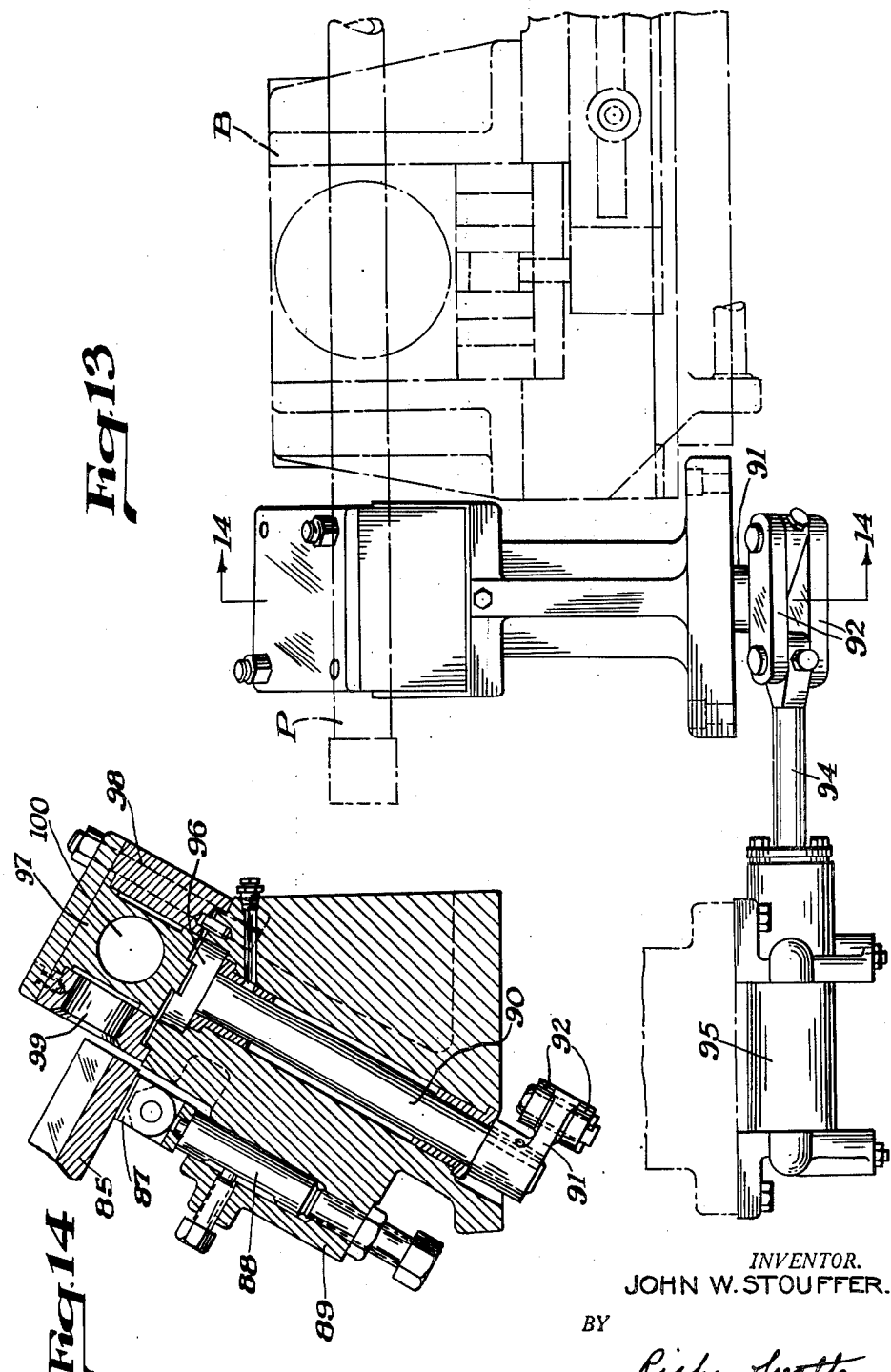

Patented May 26, 1953

2,639,497

UNITED STATES PATENT OFFICE 2,639,497

COUPLING SCREW-ON MACHINE

John W. Stouffer, Youngstown, Ohio, assignor to Republic Steel Corporation, Cleveland, Ohio, a corporation of New Jersey Application April 24, 1948, Serial No. 23,042

8 Claims. (Cl. 29—240)

This invention relates generally to the art of operating on the ends of elongated cylindrical articles, and more particularly it relates to a machine which is capable of carrying out automatically all the operations involved in screwing couplings on the ends of pipe and tubing.

Heretofore, machines have been proposed for screwing couplings on the ends of pipe or tubing but, so far as I am aware, each of such machines required one or more operators per machine. The present invention provides a machine for this purpose which is automatic in substantially all respects and does not normally require an operator for any purpose other than to start the machine.

The present invention will be better understood by those skilled in the art from the drawings accompanying and forming a part of this specification in which a preferred embodiment is illustrated and in which:

Fig. 1 is a side elevational view of the complete machine except for such auxiliary devices as electrical and hydraulic connections;

Fig. 2 is an end elevational view taken from the pipe loading device represented at the right hand side of Fig. 1;

Fig. 3 is a fragmentary detail view partly in section of parts of the pipe handling mechanism;

Fig. 4 is a top plan view of the pipe vise and associated mechanism of Fig. 1;

Fig. 6 is a vertical sectional view through the pipe vise taken on line 6—6 of Fig. 5;

Fig. 7 is a side elevational view partly in section of the pipe vise;

Fig. 8 is a vertical sectional view taken on line 8—8 of Fig. 7;

Fig. 8a is a fragmentary vertical sectional view taken on line 8a—8a of Fig. 7;

Fig. 9 is a sectional view taken on line 9—9 of Fig. 7;

Fig. 11 is a vertical sectional view, partly in elevation, taken on line 11—11 of Fig. 1 and showing the coupling hopper and feeder of Fig. 1;

Fig. 12 is a vertical sectional view taken on line 12—12 of Fig. 11;

Fig. 13 is a side elevational view of the coupling indexer with its actuating means; and Fig. 14 is a vertical sectional view taken on line 14—14 of Fig. 13.

Figure 5:
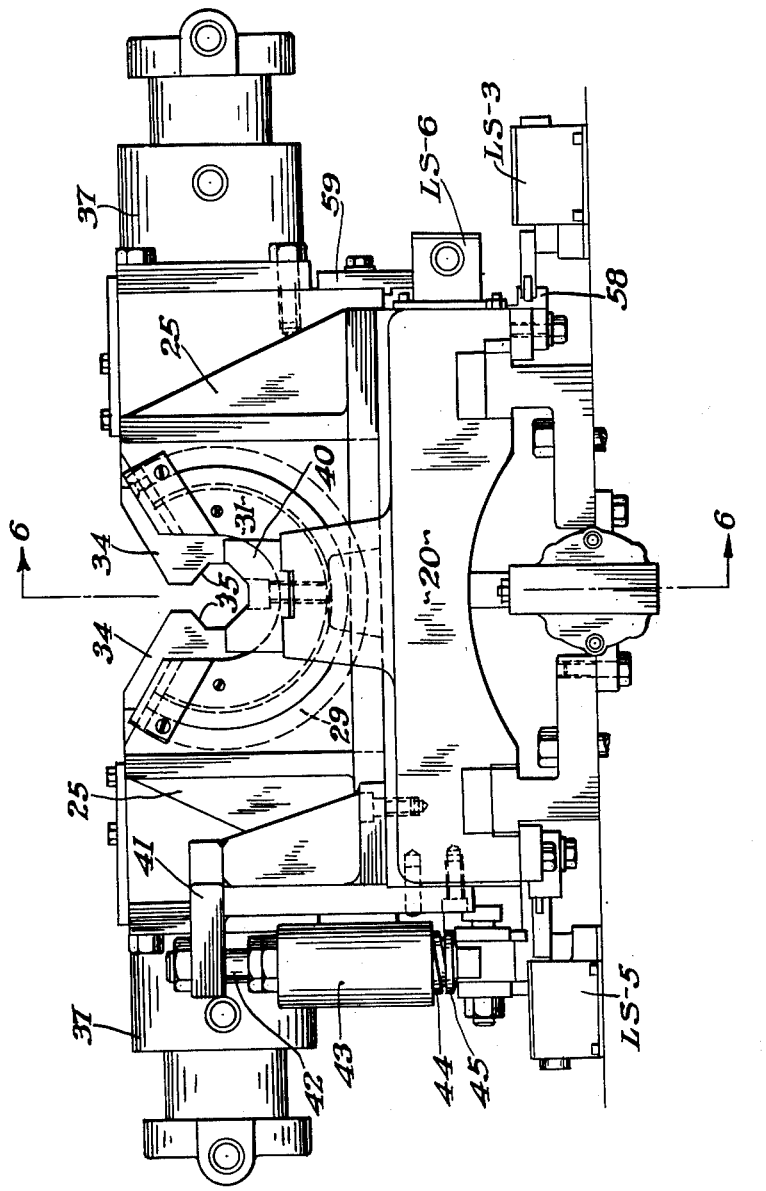
Fig. 5 is an end elevational view of the pipe vise as viewed from the loading end or right hand end of the machine of Fig. 1.

The apparatus shown in the accompanying drawings is a machine which comprises a plurality of parts which cooperate with each other to initiate and carry through consecutively a series of steps which accomplish the screwing of a coupling onto the end of a pipe to a predetermined extent or until a predetermined amount of resistance is encountered. As shown in Fig. 1, this apparatus comprises a pipe handling mechanism indicated generally at A, a pipe vise mechanism B for holding and advancing a pipe endwise, a coupling feeder mechanism C for feeding couplings one at a time endwise from a hopper, an indexing mechanism D to receive couplings from feeder C and index them, i. e., align them axially with a pipe in vise B, a coupling chuck E which is adapted to grip a coupling brought between the jaws thereof by a pipe in vise B, and to turn the coupling and thereby screw it onto the end of the pipe, and automatic apparatus including a plurality of switches for causing the various parts of the machine to operate in predetermined sequence and time and to cease operating when there is no coupling in the indexer.

Pipe handling device

The pipe handling mechanism A is shown in some detail in Figs. 2 and 3. This mechanism comprises a pipe skidway including a plurality of rails 1 (only one of which is shown) on which pipes to be fitted with couplings may roll until stopped by abutments 2. Another skidway represented by rails 3 (only one is shown) is disposed to receive pipes after being fitted with couplings and is inclined to permit these pipes to roll away from the machine. Between the two skidways is located mechanism for lifting a pipe from rail 1 lowering it into position to be gripped by vise B and for lifting the pipe out of the vise and discharging it onto rails 3. This mechanism comprises a plurality of similar members one of which is shown in Figs. 2 and 3. Each such member comprises a base plate 4 have a vertical tubular guide 5 extending upwardly therefrom in which a cylinder 6 slides and is guided.

A plate 7 is attached to the upper end of cylinder 6 and has an upper inclined surface consisting of two portions 8 and 8a connected by a vertical surface 8b. Surfaces 8 and 8b form a notch for a purpose presently to appear. At its lower end, cylinder 6 is pivotally connected to a link 9. A shaft 10, which is long enough to cooperate with the several links 9, carries arms 11 keyed thereto for pivotal connection to all links 9. One arm 11 is formed integrally with an arm 12 which is pivotally connected at its free end to link 14. This link is pivotally connected to a piston rod 15 which has a piston thereon (not shown) within cylinder 16 in which the piston may be reciprocated by hydraulic pressure admitted, alternately as desired, into opposite ends of the cylinder. A switch operating arm 17 is also keyed onto shaft 10 to make and break contacts in switches LS-1 and LS-2. The broken lines in Fig. 3 indicate the top position of plates 7 as well as the different positions occupied by tubing being handled by the device.

When fluid pressure is admitted into the right-hand end of cylinder 16, it actuates the connections between rod 15 and cylinders 6 thereby lifting plates 7 to the dotted line position. As the plates move up past skid 1 they lift a pipe P from the skid. The pipe rolls down the inclined surfaces 8 as soon as the pipe is lifted above stops 2 and lodges against vertical surfaces 8b. When the plates 7 reach their top position, arm 17 actuates switch LS-2 and this switch acts to stop the flow of fluid into the right-hand end of cylinder 16 and to cause fluid under pressure to flow into the left-hand end of the cylinder thereby lowering plates 7. As the plates move down, pipe P is deposited in the pipe vise, presently to be described, and takes the lowermost indicated broken line position of pipe P in Fig. 3. When the plates 7 are next lifted the surfaces 8a engage the pipe and lift it until it can roll off those surfaces onto skid 3.

Pipe vise

The pipe vise B of the present machine is shown generally in Fig. 1 and in detail in Figs. 4 to 9 inclusive. This vise comprises a carriage 20 mounted for sliding movement endwise of the bed K of the machine. The carriage has a depending flange 21 to which one end of a piston rod 22 is connected, the other end of the rod carrying a piston (not shown) in cylinder 23 which is attached to the machine bed. Hydraulic pressure admitted selectively into opposite ends of cylinder 23 is used to reciprocate carriage 20 as desired. On the upper side of carriage 20 are mounted two end plates 25 and attached thereto are two bearing races 26 which are approximately 270° in length. Chuck body 27 is positioned between races 26 and has a lower portion which extends into a groove 28 in carriage 20 and is attached at each end to trunnions 29 which have bearing engagement on rollers 30 which bear on races 26. The trunnions 29 have dust plates 31 attached thereto to bear against outer surfaces on end plates 25 for the purpose of excluding dirt, chips and the like from the bearings 30. The groove 28 has a bottom surface 32 inclined transversely of the machine and extending upwardly from the front to the back of the machine and at its top rear end it engages the under surface of chuck body 27. By reason of this groove shape and the trunnions, the chuck body may be rotated about the center of rotation of trunnions 29 when desired, but is normally maintained in a horizontal position.

Chuck body 27 has vertical slots in its upper portion in which jaw carrying bodies 33 are slidable toward and away from each other transversely of the machine. Each body 33 has detachably connected thereto a pipe gripping jaw 34 which preferably has smooth pipe engaging surfaces 35 whereby a pipe may be gripped for axial propulsion and for holding against turning movement until a predetermined turning effort is attained after which the pipe may rotate relative to said surfaces without being cut or seriously marred thereby. Each body 33 is connected to a piston rod 36 which has a piston (not shown) mounted in cylinder 37 for reciprocation by fluid under pressure. At the middle of its rear end carriage 20 has a pipe rest 40 which serves to support a pipe substantially on the center line of the surfaces 35 of jaws 34.

Near one rear corner, carriage 20 has a bracket 41 which supports a depending rod 42 to which is attached a spring housing 43 within which spring 44 is compressed by plunger 45. The lower end of this plunger bears on one end 46 of a lever-like member 47 which is pivoted near its mid-portion on pivot pin 48 extending into the side of carriage 20 and at its other end 49 houses the lower end of arm 50 which depends from pivot 51 carried by bracket 52 attached to the front side of chuck body 27.

The pivot pin 48 and its associated parts is better shown in Fig. 8a where it is shown as being affixed to carriage 20 and as carrying sleeve bearings 53 in an aperture in part 47 of the lever for relatively free pivoting action of the lever.

Figs. 8 and 9 show means for keeping the vise jaws 34 central with respect to the machine spindle. This means comprises a pair of racks 55 attached, respectively, to jaw carriers 33 and movable endwise in a recess in chuck body 27 extending transversely of the machine. Each rack 55 engages with a pinion 56 rotatably mounted on a pinion holder 57 secured to chuck body 27. The vise jaws may be adjusted relative to each other and to the centerline of the machine spindle and then may be maintained in adjustment by engaging the pinion with each rack.

At its other rear corner, carriage 20 carries an adjustable switch actuating lug 58 to actuate switch LS-3 which is mounted on the bed of the machine.

A vertically adjustable plate 59 depends from the rear side of chuck body 27 and is engageable with switch LS-6 attached to the machine bed.

An arm 60, which extends out from the front corner of carriage 20, is engageable with switch LS-5 carried by the machine bed.

The operation of the pipe vise is substantially as follows: When the pipe handling device, previously described, delivers a pipe into the space between jaws 34 and on rest 40, switch LS-1 is actuated by arm 17 on shaft 10. This switch causes fluid under pressure to enter cylinders 37 and close jaws 34 on the pipe and then causes fluid under pressure to enter cylinder 23 and move the carriage toward the left in Fig. 1, the jaws carrying the pipe along with them. When, by means of mechanism presently to be described, the flow of fluid pressure into cylinder 23 is diverted to the other end of the cylinder, carriage 20 is moved backwardly until lug 58 engages and actuates switch LS-3. This switch, in turn, shuts off the flow of fluid pressure to cylinder 23, admits fluid pressure into cylinders 37 to retract the jaws from the pipe, and admits fluid pressure into the right-hand end of cylinder 16, thereby initiating another operation of the loading mechanism.

Coupling feeder

The coupling feeder C is shown in Figs. 1, 2, 11 and 12. Its moving parts are actuated by motor 61 through shafts 62 and 63. This feeder comprises a hopper 65 having a bottom portion formed by parallel walls 66, which are spaced apart a short distance to permit movement therebetween of a feeding device. The hopper is open at the top to receive a quantity of couplings and has a downwardly inclined wall 67 extending over and beyond the feeder device to divert couplings to the receiving end of the feeder device, an access door 68 on the rear sloping side thereof; and a front access door 69. Hopper 65 is supported on the walls 66 and the whole assembly rests on the top of the machine base K. A drive shaft 70, driven by shaft 63, is mounted on bearings in walls 66 and carries a gear 71 which meshes with a larger gear 72 which is keyed onto shaft 73 which is similarly mounted in bearings in walls 66. Shaft 73 also has keyed thereto a crank arm 74 carrying a crank pin 75 on which is rotatably mounted a link 76. This link is pivoted to a crank arm 77 which is keyed to shaft 78. This shaft is mounted in bearings supported by walls 66 and has keyed to it between those walls a feeder device. This device comprises an elongated slide 79 having a V-shaped groove therein, and a guard including two upstanding arms 80 affixed to slide 79 and projecting upwardly therefrom near the lower end of the slide and carrying a bolt 81 which extends through elongated slots therein and which has mounted thereon a block 82. By adjusting the position of block 82 relative to slide 79, the device may be adjusted to permit couplings of any desired diameters to slide endwise along slide 79 but to prevent couplings to move along the slide in any other position.

A continuation of slide 79 is shown at 85 where a similar slide is supported at its upper end by bracket 86 surrounding shaft 78 between walls 66. The lower end of slide 85 has a lug 87 which is connected to a rod 88 which is adjustable in indexing block 89.

*Coupling indexer*

The coupling index mechanism D of Fig. 1 is illustrated in more detail in Figs. 13 and 14. The indexer block 89 is supported on machine base K and, in addition to carrying the adjustable rod 88 for adjusting the position of the lower end of coupling slide 85, this indexing block is provided with a shaft 90 which may be reciprocated through about 90° by reason of the crank arm 91 which is attached to the lower end thereof and which is pivotally connected through links 92 to piston rod 94 which is connected to a piston (not shown) movable within cylinder 95 by admission of fluid under pressure at either end thereof. At its upper end shaft 90 has a head 96 provided with a keyway in its top surface. Cylindrical block 97 has a key on its lower surface to seat in the said keyway, is substantially cylindrical and has a cylindrical hole 100 therethrough slightly larger than the outside diameter of the coupling which is to be screwed onto a pipe. Block 97 is rotatable within housing 98 which is secured to the upper end of indexing block 89. This housing has an opening 99 through one wall thereof in alignment with slide 85 so that a coupling which is fed from slide 79 onto 85 may proceed into opening 99 and thence into the cylindrical hole 100 in block 97 when the block is turned to align that hole with opening 99. Housing 98 also has two other openings similar to 99 but with their axes at right angles thereto so that hole 100 in block 97 may be brought into alignment therewith. The centerline of hole 100 is on the centerline of a pipe gripped by jaws 35 and, as a result, when a pipe P is moved endwise by vise B, it may pass through the pair of aligned holes in housing 98 and hole 100 in block 97 and there engage and push ahead of it a coupling received through 99 and indexed into alignment with the pipe.

The operation of the coupling indexer is substantially as follows: Shaft 70 is driven and, by engagement of its gear 71 with gear 72, arm 74 is rotated and link 76 is reciprocated with resultant reciprocation of arm 77 and shaft 78 and slide 79 keyed to the same shaft. When the upper end of slide 79 is moved downwardly, couplings may feed thereunto from the supply in hopper 65. As the slide 79 is moved back to the full line position shown in Fig. 11, these couplings will move down the slide and if the couplings adjacent to guard 80 extend lengthwise of the groove in slide 79, it may pass the guard and move down slide 85 and into opening 99 in housing 98 where the lower end may bear against the side of coupling block 97. When piston rod 94 is moved (to the left in Fig. 13) block 97 will be rotated through 90° and brought into alignment with opening 99 and the coupling therein, whereupon the coupling will slide into the hole 100. Reverse movement of piston rod 94 will rotate block 97 so that the coupling will be aligned with the pair of openings in the side of housing 98 and with a pipe P.

*Coupling chuck*

Figure 10:
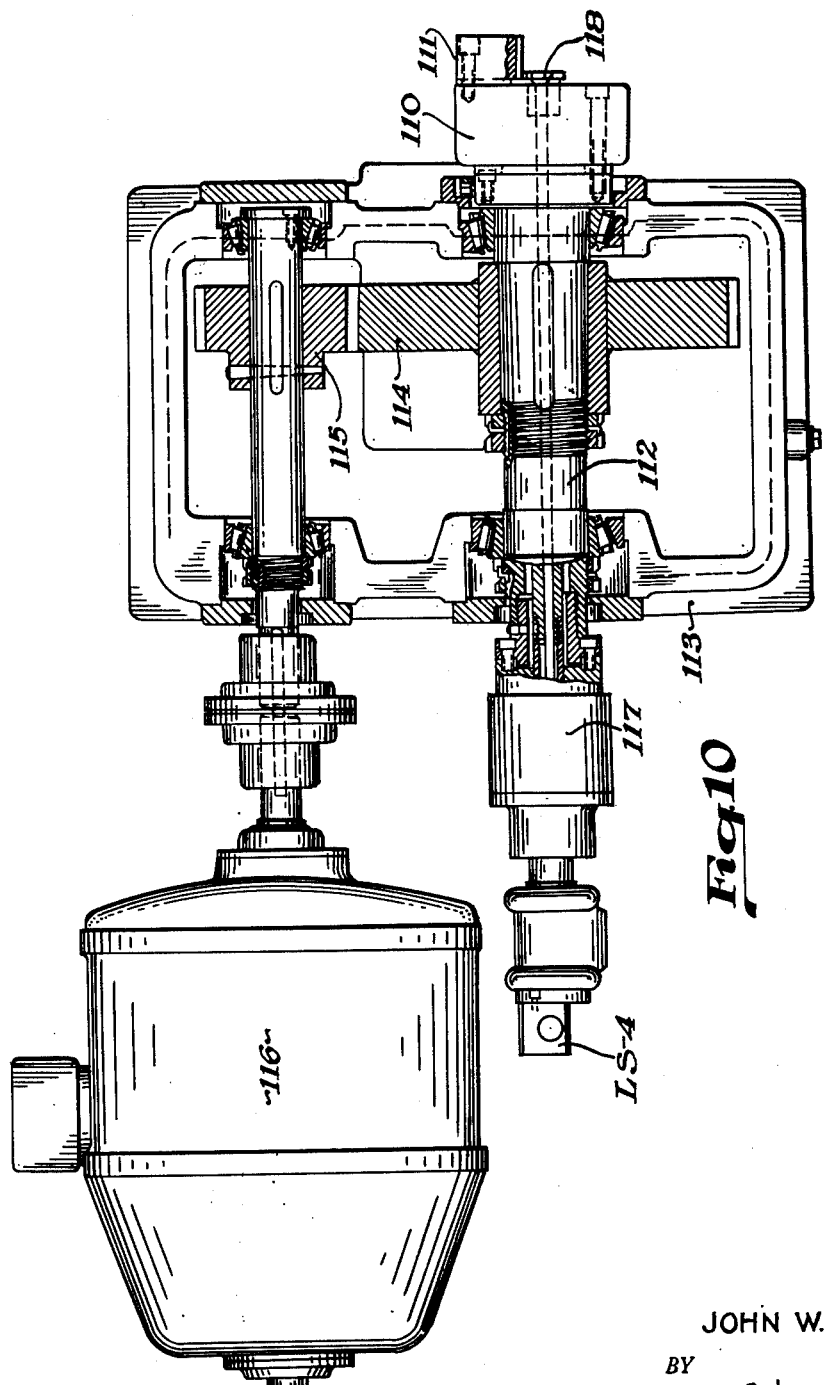
Fig. 10 is a top plan view partly in horizontal section of the coupling chuck of Fig. 1.

The coupling chuck, indicated generally at E in Fig. 1, is shown in some detail in Fig. 10. This chuck includes a body 110 having jaws 111, the body being mounted on shaft 112 which is mounted for rotation in bearings in housing 113 resting on the machine bed K. This shaft 112 is driven by meshing gears 114 and 115 from motor 116. The chuck jaws 111 are actuated to grip or release a coupling by hydraulic means 117 supported at the opposite end of shaft 112, the hydraulic fluid in means 117 communicating with the chuck jaw operating mechanism through passages in shaft 112. This hydraulic means 117 is controlled by switch LS-4 which is actuated by a rod 118 which extends from the switch through shaft 112 to, and slightly beyond, the face of chuck body 110 where it is engageable by a coupling. When a coupling is pushed from indexer D against the end of rod 118, this rod is pushed endwise (toward the left in Figs. 1 and 10) and its left end actuates switch LS-4 which actuates the hydraulic means 117 to move the jaws to grip the coupling. Rod 118 is urged toward the right in Fig. 10 by spring means (not shown). Since the shaft 112 is constantly rotating, a coupling gripped by jaws 111 will rotate instantly upon being so gripped and will be screwed onto the pipe P which propelled the coupling against the end of rod 118.

*Operation of the machine*

Since the operation of the various parts of the present machine have been indicated hereinabove without reference to how those operations are modified, effected or synchronized with each other, a complete operating cycle of the machine will be described. A supply of pipes which are to have couplings threaded on the ends thereof is placed on skids 1, the motors 61 and 116 are energized with simultaneous rotation of chuck body 110 and feeder shaft 70. Switch LS-3 is closed, whereupon shaft 10 is rotated clockwise, as viewed in Fig. 3, and plates 7 lift one pipe off skids 1 and the pipe rolls down against surface 8a. At that time arm 17 on shaft 10 actuates switch LS-2 which reverses the rotation of shaft 10 and lowers the pipe into the space between chuck jaws 34 and onto rest 40. As the pipe comes between surfaces 35 of jaws 34, arm 17 actuates switch LS-1 which causes fluid under pressure to enter cylinders 37 and advance jaws 34 into gripping contact with the pipe. The end of the pipe remote from the machine may rest on the top surface 8a of one or more of the feeder plates 7.

Coincident with gripping of the pipe by jaws 34, switch LS-1 also causes the admission of fluid pressure into the righthand end of cylinder 23 as viewed in Fig. 6 with consequent movement of carriage 20 toward the left of the machine in Fig. 1. Since the pipe is gripped in the jaws of vise B, which is connected to carriage 20, the pipe is moved endwise.

The timing of indexer D is such that block 97 is turned to receive a coupling through opening 99 and to turn block 97 through 90° and present the coupling therein into alignment with the opposed pair of holes in housing 98, all between the time a pipe is retracted from the indexer and the time a new pipe nears the indexer. As a result, a pipe being advanced by vise B may proceed into the indexer where the first few threads on the pipe and coupling may become interengaged. As the pipe advance continues the coupling is pushed from the indexer against rod 118 and moves the latter endwise whereupon the chuck jaws grip and rotate the coupling, thereby screwing it onto the pipe which is held against rotation by the smooth surfaces 35 of the pipe vise. As screwing on of the coupling proceeds the resistance to further turning movement increases and, when that resistance attains a predetermined amount, comparable to a predetermined extent of screwing on movement, the tendency of the pipe to rotate is transferred to the vise chuck and rotation thereof on bearings 30 occurs. Such rotational movement of the chuck body 27 moves rod 50 downwardly, thereby pivoting arm 47 about its pivot 48 and exerting upward pressure at the other end of lever 47 against plunger 45 and spring 44 in spring housing 43, the compression on the spring being such as to impede and finally limit the extent of such turning movement by exceeding the frictional engagement of the pipe and jaw surfaces 35. As the chuck body 27 is thus rotated, arm 59 is moved upwardly and actuates switch LS-6 which initially causes a reversal of fluid pressure in device 117 with resultant retraction of the coupling jaws 111 and immediately thereafter admits pressure into cylinder 23 to return the pipe vise to its starting position where lug 58 engages switch LS-3 and initiates a repetition of the foregoing cycle of operations. Switch LS-6 also causes reversal of fluid pressure in cylinders 37 and retraction of pipe jaws 34 when the carriage 20 has been returned almost to the starting end of its stroke. This retraction of the jaws releases the pipe so that it may be lifted from the vise on the next stroke of feeder plates 7 and discharged onto skids 3.

It will be understood that the coupling feeder is operating continuously while motor 61 is energized and that when and if the slide 85 is filled with couplings positioned end to end and extending from the indexer to the gauge 80, continued operation of feeder 79 will not discharge any more couplings onto slide 85.

In the event that there is no coupling in indexer D when a pipe is moved thereinto, carriage 20 may continue to advance beyond the place where it would be halted if a coupling had been present in the indexer and lug 60 will thereupon engage and actuate switch LS-5 which throws the switch in power line of motors 61 and 116, thereby stopping operation of the entire machine. After such a stoppage, it is necessary manually to actuate switch LS-3 after having energized motors 61 and 116.

While one modification of my invention has been described in some detail hereinabove with reference to screwing a coupling onto a tube or pipe, it is to be understood that the invention is not to be limited thereto. Obviously, the invention could be embodied with but few or slight changes in structure or apparatus for screwing nuts on bolts, or collars or caps on tubes, or apparatus for threading tubular articles or for performing similar operations. I desire to be understood as intending to include as part of my invention all embodiments thereof which are comprehended within what is claimed.

What is claimed is:

1. A machine for screwing couplings onto pipes which comprises an endwise movable carriage, a chuck body projecting beyond the opposite sides of the carriage, jaws in said body for gripping a pipe, means to advance the jaws to clamp them about a pipe, means to retract the jaws to release a pipe gripped thereby, trunnions rotatably supported by said carriage and connected to opposite sides of said body for limited rotation of said body about an axis extending longitudinally of said carriage, means to advance and retract said carriage, and a pipe gripped by said jaws, a coupling chuck to grip and rotate a coupling when moved endwise thereinto, means between said chucks to position a coupling in axial alignment with said pipe for engagement with the leading end of the advancing pipe and for endwise movement thereby into said coupling chuck, driving means for rotating the coupling chuck and for rotating said pipe chuck when the resistance to rotation of the coupling relative to the pipe exceeds a predetermined amount, means including an arm pivotally connected to the projection of said body beyond one side of said carriage for resilient opposing rotation of said body from its normal position and for restoring it to such normal position, and means carried by the other projection of said body and engageable with a switch for releasing a coupling in the coupling chuck and actuating said jaw releasing means and said carriage retracting means.

2. A machine for screwing couplings onto pipes which comprises an endwise movable carriage, a chuck body projecting beyond one side of the carriage, jaws in said body for gripping a pipe, means to advance said jaws to grip a pipe, means to retract said jaws to release a pipe gripped thereby, trunnions rotatably supported by said carriage and connected to opposite sides of said body for limited rotation of said body about an axis extending longitudinally of said carriage, means to advance and retract said carriage and a pipe gripped by said jaws, a coupling chuck to grip and rotate a coupling when moved endwise thereinto, means between said chucks to position a coupling in axial alignment with said pipe for engagement with the leading end of the advancing pipe and for endwise movement thereby into said coupling chuck, driving means for rotating the coupling chuck and for rotating said pipe chuck when the resistance to rotation of the coupling relative to the pipe exceeds a predetermined amount, means including a lever connected to the said projection of said body beyond one side of said carriage for resilient opposing rotation of said body from its normal position and for restoring it to such normal position, and means including an arm connected to said body for successively releasing a coupling in said coupling chuck when said driving means has rotated the pipe chuck to a predetermined extent, and actuating said carriage retracting means.

3. A machine for screwing couplings onto pipes which comprises an endwise movable carriage, a chuck body projecting beyond one side of the carriage, jaws in said body for gripping a pipe, means to advance the jaws to clamp them about a pipe, means to retract said jaws to release a pipe gripped thereby, trunnions rotatably supported by said carriage and connected to opposite sides of said body for limited rotation of said body about an axis extending longitudinally of said carriage, means to advance and retract said carriage and a pipe gripped by said jaws, a coupling chuck to grip and rotate a coupling in engagement with the leading end of the advancing pipe, driving means for rotating the coupling chuck and for rotating said pipe chuck when the resistance to rotation of the coupling relative to the pipe exceeds a predetermined amount, means including a lever on the carriage and connected with the said projection of said body beyond one side of said carriage for resilient opposing rotation of said body from its normal position and for restoring it to such normal position, and means including an arm connected to said body for releasing a coupling in said chuck when the pipe chuck has been rotated to a predetermined extent.

4. A machine for screwing couplings onto pipes which comprises an endwise movable carriage, a chuck body projecting beyond the opposite sides of the carriage, jaws in said body for gripping a pipe, means to advance the jaws to grip a pipe, means to retract the jaws to release a pipe gripped thereby, trunnions rotatably supported by said carriage and connected to opposite sides of said body for limited rotation of said body about an axis extending longitudinally of said carriage, means to advance and retract said carriage and a pipe gripped by said jaws, a coupling chuck to grip and rotate a coupling in engagement with the leading end of the advancing pipe, driving means for rotating the coupling chuck and for rotating said pipe chuck when the resistance to rotation of the coupling relative to the pipe exceeds a predetermined amount, means on the carriage and connected to the projection of said body beyond one side of said carriage for resilient opposing rotation of said body from its normal position and for restoring it to such normal position, and means including an arm connected to the other projection of said body and a switch engageable with said arm for releasing the coupling from the coupling chuck when the pipe chuck has been so rotated and for subsequently actuating said carriage retracting means.

5. A machine for screwing couplings onto pipes which comprises an endwise movable carriage, fluid-actuated means to advance and retract said carriage, a chuck body on and projecting beyond one side of the carriage, jaws in said body for gripping a pipe, fluid-actuated means to advance the chuck jaws to grip a pipe, fluid-actuated means to retract the chuck jaws to release a pipe gripped thereby, trunnions rotatably supported by said carriage and connected to opposite sides of said body for limited rotation of said body about an axis extending longitudinally of said carriage, a coupling chuck to grip and rotate a coupling in engagement with the leading end of the advancing pipe, driving means for rotating the coupling chuck and for rotating said pipe chuck when the resistance to rotation of the coupling relative to the pipe exceeds a predetermined amount, resilient means on the carriage and actuated by the projection of the body beyond one side of said carriage for opposing such rotation of said body, and means including a fluid switch actuated by the other said projection of said body when the chuck body has been so rotated for releasing a coupling in said coupling chuck and then actuating said carriage retracting means and said pipe jaw retracting means.

6. In a machine for screwing couplings onto pipes, an endwise movable carriage, means to advance and retract said carriage, a chuck body on said carriage having jaws to grip a pipe and projecting beyond one side of said carriage, means to advance and means to retract said pipe jaws, trunnions connected to opposite sides of said body and mounted in bearings supported by said carriage for limited rotation of said body about an axis extending longitudinally of said carriage and parallel to its line of movement, a coupling chuck, driving means for rotating said coupling chuck and rotating said pipe chuck when the resistance to rotation of a coupling gripped by said coupling chuck and threaded onto said pipe exceeds a predetermined amount, means carried by said carriage and engageable with the projection of the body beyond one side of the carriage for resiliently resisting such rotational movement of said chuck, and for urging rotation of said chuck back to its normal position, and means actuated by the chuck body when the latter is rotated to a predetermined extent for successively releasing the coupling in the coupling chuck, actuating said carriage retracting means and said pipe jaw retracting means.

7. A machine for screwing couplings onto pipes which comprises a machine bed, a carriage slidable horizontally endwise on said bed, means to advance and retract said carriage on the bed, a chuck body mounted on said carriage for limited rotation about an axis substantially parallel to the direction of movement of the carriage, jaws in said chuck body, means to advance and retract said jaws to grip and release a pipe, a coupling chuck having jaws to grip and release a coupling, means to drive said coupling chuck and to rotate a coupling held thereby while in engagement with the end of a pipe in the pipe chuck and to rotate the latter when the resistance to rotation of the coupling relative to the pipe exceeds a predetermined amount, and means on the carriage actuated by rotation of the pipe chuck to a predetermined extent successively to release the coupling chuck from a coupling held thereby, to retract the carriage and to release a pipe in the pipe chuck.

8. A torsion chuck comprising an endwise movable carriage, means to advance and retract said carriage, a chuck body having article-gripping jaws and projecting beyond one side of said carriage, means to advance and retract said jaws, trunnions connected to opposite sides of said body and mounted in bearings supported by said carriage for limited rotation of said body about an axis extending longitudinally of said carriage and parallel to its line of movement, a lever pivotally connected between its ends to one side of said carriage, a rigid member connecting one end of said lever to the said projection of said body, and resilient means supported by said carriage for exerting force on the other end of said lever to resist rotation of said body out of its normal position and to urge it toward its normal position.

JOHN W. STOUFFER.

References Cited in the file of this patent

UNITED STATES PATENTS

| Number | Name | Date |
|---|---|---|
| 323,180 | Mason | July 28, 1885 |
| 992,887 | La Voo | May 23, 1911 |
| 1,212,605 | Brightman | Jan. 16, 1917 |
| 1,765,825 | Cork | June 24, 1930 |
| 1,979,731 | Burge | Nov. 6, 1934 |
| 2,015,645 | Chase et al. | Sept. 24, 1935 |
| 2,067,626 | Benninghoff | Jan. 12, 1937 |
| 2,112,240 | Hibbard | Mar. 29, 1938 |
| 2,206,031 | Drissner | July 2, 1940 |
| 2,215,270 | Mathias | Sept. 17, 1940 |
| 2,235,084 | Ortegren et al. | Mar. 18, 1941 |
| 2,289,140 | Mohan | July 7, 1942 |
| 2,359,167 | Somes | Sept. 26, 1944 |
| 2,421,916 | Underwood | June 10, 1947 |
| 2,426,095 | Hecker | Aug. 19, 1947 |
| 2,438,999 | Hartley et al. | Apr. 6, 1948 |
| 2,518,009 | Hess | Aug. 8, 1950 |
| 2,518,172 | Packer | Aug. 8, 1950 |